United States Patent [19]
Daudelin

[11] Patent Number: 4,959,855
[45] Date of Patent: Sep. 25, 1990

[54] DIRECTORY ASSISTANCE CALL PROCESSING AND CALLING CUSTOMER REMOTE SIGNAL MONITORING ARRANGEMENTS

[75] Inventor: Abraham N. Daudelin, Colts Neck, N.J.

[73] Assignee: AT&T Bell Laboratories, Murray Hill, N.J.

[21] Appl. No.: 225,607

[22] Filed: Jul. 25, 1988

Related U.S. Application Data

[63] Continuation of Ser. No. 916,615, Oct. 8, 1986, abandoned.

[51] Int. Cl.$^5$ .................... H04M 3/50; H04M 1/64
[52] U.S. Cl. .................................. 379/213; 379/88; 379/84
[58] Field of Search ............... 379/67, 69, 70-74, 379/84, 88, 89, 210-214, 96, 97, 201, 207, 218

[56] References Cited

U.S. PATENT DOCUMENTS

| | | | |
|---|---|---|---|
| 4,164,025 | 8/1979 | Dubnowski et al. | 364/900 |
| 4,608,460 | 8/1986 | Carter et al. | 379/89 |
| 4,656,624 | 4/1987 | Collins et al. | 379/265 |
| 4,677,609 | 6/1987 | Piereth et al. | 370/60 |

FOREIGN PATENT DOCUMENTS

| | | |
|---|---|---|
| 0178111 | 4/1986 | European Pat. Off. |
| 1291796 | 4/1969 | Fed. Rep. of Germany |
| 3231835 | 3/1984 | Fed. Rep. of Germany |
| 3422409 | 12/1985 | Fed. Rep. of Germany |
| 3532907 | 3/1986 | Fed. Rep. of Germany |
| 60-149253 | 8/1985 | Japan |
| 60-152168 | 8/1985 | Japan ............ 379/88 |
| 60-204155 | 10/1985 | Japan ............ 379/67 |
| WO86/02219 | 4/1986 | PCT Int'l Appl. |

OTHER PUBLICATIONS

N. X. DeLessio et al., "An Integrated Operator Services Capability for the 5ESS System", *ISS* '84, Session 22 C, Paper 3, Florence, May 7-11, 1984, pp. 1-5.

C. M. Smits, "Telephone Management Functions", *Philips Telecommunication Review*, vol. 43, No. 2, Jun. 1985, pp. 172-181.

H. Mulla, "A PABX That Listens And Talks", *Speech Technology*, vol. 2, No. 2, Jan.-Feb. 1984, pp. 74-79.

G. Arndt et al., "Automatische Rufnummernauskunft Mid Dem Fernsprecher Als Datenstation-Das Versuchssystem AURA Fur Nebenstellenanlagen", *Information Fernsprech-Vermittlungstechnik*, vol. 8, No. 3, 1972, pp. 119-122.

D. S. Cheeseman et al., "Voice Signalling in the Telephone Network", *The Radio and Electronic Engineer*, vol. 53, No. 6, Jun. 1983, IERE, pp. 241-247.

S. D. Hester et al., "The AT&T Multi-Mode Voice Systems—Full Spectrum Solutions for Speech Processing Applications", *Proceedings of the 1985 AVIOS Conference*.

J. P. Maury, "The Electronic Directory Service", *Commutation & Transmission*, 5, No. 5, Dec. 1982, pp. 31-42.

"CCI Signs Deal with Northern", *Telephony*, Oct. 6, 1986, p. 100.

*Primary Examiner*—Stuart S. Levy
*Assistant Examiner*—James E. Tomassini
*Attorney, Agent, or Firm*—Werner Ulrich

[57] ABSTRACT

Methods and apparatus are described for automatically connecting a calling customer to the customer identified by the directory number requested by the calling customer from a directory assistance operator. The calling customer need not disconnect and reoriginate a call; instead, the directory assistance system uses the directory number information located in response to the calling customer's request to control the establishment of a connection directly. The request for such a connection is detected by the operator or by a voice processing unit used to monitor a connection for announcing the directory number to the calling customer.

15 Claims, 5 Drawing Sheets

FIG. 5

DIRECTORY ASSISTANCE CALL PROCESSING AND CALLING CUSTOMER REMOTE SIGNAL MONITORING ARRANGEMENTS

This application is a continuation of application Ser. No. 916,615, filed Oct. 8, 1986, now abandoned.

CROSS-REFERENCE TO RELATED APPLICATION

This application is related to the application of A. N. Daudelin 2 entitled "Elimination of False Requests For Telephone Operator Assistance", Ser. No. 916,611 which application is assigned to the assignee of the present application, and is being filed concurrently herewith.

TECHNICAL FIELD

This invention deals with telecommunications operator service systems and specifically with the use of automatic voice recognition techniques to enhance performance of such systems.

PROBLEM

Many modern directory assistance systems use a computer aided directory assistance search arrangement. In such systems, when an operator has found an apparently correct listing, the operator signals the identity of the correct listing and disconnects from the directory assistance call. The listing is then automatically announced to the calling telephone customer.

The use of voice processing to classify operator assistance calls, such as person, collect, or charge to third party, automatically, is disclosed incopending patent application "Automated Operator Assistance Calls With Voice Processing", Ser. No. 860,651, submitted by A. N. Daudelin and assigned to the assignee of the present patent application.

A problem encountered in offering directory assistance service is that the method of setting up calls to a customer whose directory number has been found with the help of directory assistance service is very inefficient. The customer first makes a call to a directory assistance system, obtains the desired number and then must disconnect and establish a new connection by dialing the information just obtained.

SOLUTION

The above problem is solved and an advance is made in the art in accordance with my invention wherein in a telecommunications switching system, after a listing has been located in response to a request from a calling customer station, a connection is set up between the calling customer station and a customer station identified by the listing. Illustratively, an announcement is transmitted to the calling customer station asking whether a call to the customer station identified by the listing should be set up; such an announcement may but need not include the directory number of the listing. After a customer has received an announcement, a voice processing unit monitors a communication link connected to that customer for a predetermined interval to detect non-supervisory signals (illustratively voice or dual-tone signals) representing customer commands for further processing a call.

When a customer has received an announcement of a directory number found by a directory assistance operator, the customer can indicate by a voice or dual-tone signal command, detected by a voice processing unit, that a call to that directory number should be placed automatically by the switching system without further call processing effort by the calling party. Such an arrangement saves customers the trouble of dialing the number to complete a call and eliminates unnecessary call originating and processing operations by the telephone switching system. Advantageously, this is accomplished without increasing the operator work time on a directory assistance call.

If the call is to an unlisted number, the caller is connected to an operator and the customer can request an emergency connection to a customer at the unlisted number; such a connection is then set up under operator control without revealing the unlisted number.

In accordance with another aspect of the invention, a customer dials a special number and is then automatically connected to the customer station identified by a listing. Advantageously, such an arrangement saves a customer the effort of making a special request and saves operator time required to enter data indicating the connection request.

DETAILED DESCRIPTION

Figure 1:
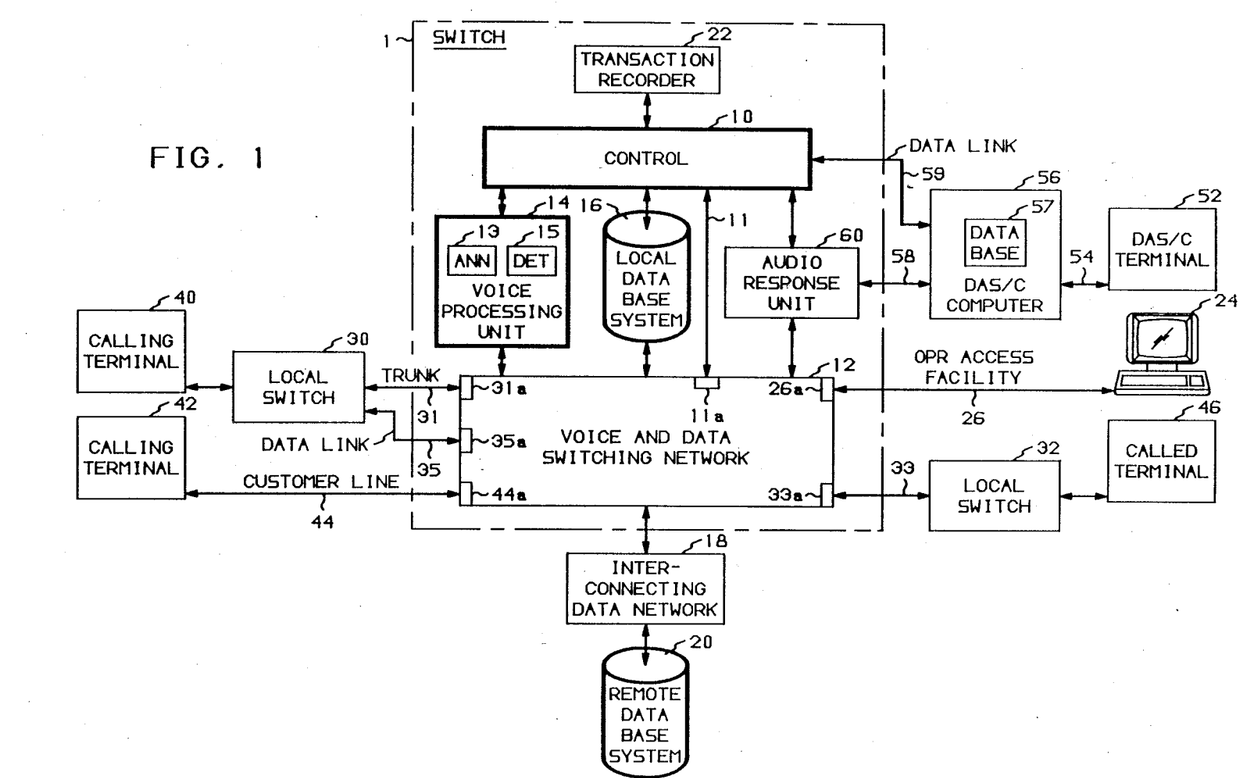
FIG. 1 is a block diagram of a telecommunications switch and auxiliary facilities adapted to offer directory assistance service including a control unit, local and remote data bases, and a voice processing unit shown in heavy outlines to indicate that these units include the modifications over the prior art to practice the present invention.

In FIG. 1, block 1 represents a telecommunications switching system or switch operating under stored program control and having within it the elements necessary for practicing the invention. Switch 1 is a switch such as the 5ESS TM switch manufactured by AT&T Technologies, Inc., arranged to offer the Operator Services Position System (OSPS) features. The 5ESS switch is described, for example, in *AT&T TECHNICAL JOURNAL*, v. 64, no. 6, part 2, pp. 1305-1564, and the OSPS feature is described, for example, in Paper 3, Session 22C presented at the International Switching Symposium in Florence, May 1984.

Within switch 1 are various blocks for carrying out the functions of a telecommunications switch. Control 10 is a distributed control system operating under the control of a group of data and call processing programs to control various blocks of the switch. In order to practice the present invention for directory assistance systems, the operator services control programs must be augmented by programs described in the flow charts of FIGS. 2-5. Block 12 is a voice and data switching network capable of switching voice and/or data between inputs connected to the switching network. Connected to the network 12 is voice processing unit 14. Input communication links to the switching network are connected at input ports identified by the number of the connected input with the letter "a" appended. Unit 14 receives a non-supervisory input signal which in the present embodiment may be either voice or a dual tone multifrequency (DTMF) signal from a calling terminal and analyzes such signals to distinguish among the various allowable DTMF signals and among the individual elements of a predetermined list of spoken responses. Unit 14 also generates tones and voice messages to prompt a customer to speak or key information into the system for subsequent recognition by the voice processing unit. Unit 14 generates an output data signal, representing the result of the voice processing; this output signal is sent to control 10 and is used as an input to the program for controlling establishment of connections in switching network 12 and for generating displays for operator position 24. Voice processing unit 14 includes announcement circuits 13 and detection circuits 15 both controlled by a controller of voice processing unit 14. In alternate configurations, the announcement and detection circuits could be separate and separately controlled. The Conversant TM 1 Voice System, Model 80, manufactured by AT&T Technologies, Inc., is one unit which can be used to carry out the functions of voice processing unit 14.

Data base systems 16 and 20 are used by switch 1 in order to control calls. Local data base system 16 is directly accessible by control 10 and accessible via switching network 12. Remote data base system 20 is accessible to control 10 via switching network 12 and an interconnecting data network 18. Remote data base system 20 is typically used for storing data that is shared by many switches. For example, a remote data base system might store data pertaining to customers for a region; the particular remote data base system that is accessed via data network 18 would be selected to be the remote data base system associated with the region of the called terminal. Interconnecting data network 18 can be any well known data network and specifically could be a network for a common channel signaling system such as the international standard telecommunications signaling system CCS 7.

Operator position terminal 24 connected to switch 1 comprises a terminal for use by an operator in order to control operator assistance calls. Data displays for the operator position terminal 24 are generated by control 10. Operator position terminal 24 is connected to switching network 12 by operator access facility 26, which may include carrier facilities to allow the operator position to be located far from switching network 12 or may be a simple voice and data access facility if the operator positions are located close to the switching network. Only one operator position including the two terminals 24 and 52 is shown in FIG. 1 but it is understood that a typical switch, arranged to offer operator assistance services, has access to a large number of such operator positions.

Connected to switch 1 are trunks 31 and 33 connected to local switches 30 and 32. These local switches 30 and 32 are connected to calling customer terminal 40 and called customer terminal 46, respectively, for connecting customer station signals between customer terminals and switch 1. Also connected to switch 1 are customer lines, including customer line 44, for connecting a customer terminal 42 to switch 1. The word "terminal" as used herein includes a simple customer telephone station, a customer station with more elaborate features such as magnetic strip card readers, or a customer voice/data terminal. In an example connection, calling terminal 40 is connected via local switch 30 to switch 1. In a more general case, other switches forming part of a larger public telephone network would be required to connect calling terminal 40 to switch 1. Calls are connected to switch 1 via communication links such as trunks 31 and 32, and customer line 44. In this example, calling terminal 40 is connected by a customer line to a 1A SSTM TM switch 30, manufactured by AT&T Technologies, Inc., and used here as a local switch, and that switch is connected to trunk 31 which is connected to switch 1. Local switch 30 is also connected to switch 1 by a data link 35 used for conveying common channel signaling messages between these two switches. Such common channel signaling messages may be used to request switch 30 to initiate the setting up of a connection, for example, between customer terminals 40 and 46. Switch 1 is connected in the example connection to called terminal 46 via local switch 32. Again, in a more general case, other switches forming part of a larger public telephone network would be required to connect called terminal 46 to switch 1. If the calling terminal is not directly connected to switch 1, the directory number of the calling terminal, identified, for example, by automatic number identification, is transmitted from the switch connected to the calling terminal to switch 1.

In order to handle directory assistance service, the system is further augmented by a directory assistance computer (DAS/C) 56 and a DAS/C terminal 52. The directory assistance operator has access to two separate operator terminals: terminal 24 previously described and terminal 52 used for communicating via data link 54 with DAS/C computer 56. The DAS/C computer has an extensive data base 57 and is used for making the searches required to be responsive to directory assistance requests. The DAS/C computer is connected via data link 58 to an audio response unit (ARU) 60 which is connected to the voice and data switching network 12. A typical DAS/C computer is manufactured by Computer Consoles, Inc. (CCI) who also manufactures an audio response unit and a DAS/C terminal. The DAS/C computer includes a data base 57 used for finding directory number listings for customers served by that DAS/C. DAS/C computer 56 is directly connected to control 10 by data link 59. The operator at terminals 24 and 52 communicates orally with a customer and on the basis of these communications keys information into the DAS/C terminal 52 for transmission to the DAS/C computer 56. The DAS/C computer 56 responds to such keyed information by generating displays of information on DAS/C terminal 52 which information may include the desired directory number. Until the customer gives enough information to locate a valid listing, the customer is not connected to an audio response unit since there is nothing to announce. However, when the operator ascertains from oral communications with a customer that the desired number or listing has been displayed, the operator signals to the DAS/C computer with additional keyed information to identify the correct listing and a directory number or a statement that the number is not published is then announced to the customer through the audio response unit, the operator in the meantime being dropped from the connection. In an alternative embodiment, terminals 24 and 52 are a single terminal and the DAS/C computer is accessed via the operator access facility 26 and network 12, and the audio response unit (ARU) 60, which is combined with voice processing unit 14, is accessed by DAS/C via network 12.

Trunks 31 and 33, customer line 44, data link 35, and operator access facility 26 are connected to network 12 at input ports 31a, 33a, 44a, 35a, and 26a respectively, and control 10 is connected via channel 11 at input port 11a.

Voice processing unit 14 of FIG. 1 is used for the detection of customer commands but not for the purpose of announcing directory numbers. This is done for convenience since an existing system is available using a DAS/C computer and an associated audio response unit 60. A voice processing system such as the previously mentioned Conversant system can perform both the monitoring and the announcement functions so that in an alternative configuration, units 60 and 14 of FIG. 1 are merged into a single voice processing system. As shown, however, unit 14 comprises announcement circuits 13 for making prompting or other announcements to the customer.

In accordance with one aspect of the present invention, directory assistance service for local and remote numbers is provided from a local source; interconnecting data network 18 is used for accessing a remote data base system 20 in case the directory assistance request is for a number in another region not served by the data base of DAS/C computer 56. Such an arrangement simplifies the process of subsequently connecting the calling customer to the terminal of the directory number retrieved by the directory assistance process, as described hereinafter with respect to FIGS. 2-5. This arrangement is used for the reasons discussed below.

In accordance with the prior art, calls for directory assistance service are routed to an operator located in the geographic area of the telephone listing. However, neither the calling number nor the billing number are available at such a distant directory assistance office. Since both of these numbers are necessary to make a record of calls for future billing, calls cannot be set up from such a distant office under present arrangements. However, both of these numbers are available at the operator services office in the calling customer's originating region. The customer's own directory number or billing number has previously been transmitted over interconnecting network 30 using automatic number identification techniques to identify the calling terminal of a customer not served by switch 1, or obtaining the billing number of a customer served by switch 1 from the local data base 16. These numbers are used at the switch serving the customer or at switch 1 to record message accounting information for billing for the directory assistance call. In switch 1, transaction recorder 22 is used for making records to bill customers for directory assistance service, or, in accordance with an advance over the prior art, to bill the calling customer for the call set up in response to the customer's subsequent request to set up a call to the retrieved directory number. The call can be set up using the link from switch 1 back to calling customer terminal 40 and continuing the connection from switch 1 to called customer terminal 46. Alternatively, a message can be sent back to switch 30 to set up a connection from switch 30 to called terminal 46 using the normal route for a dialed call from calling terminal 40 to called terminal 46.

FIGS. 2-5 are flow charts of programs for controlling the automatic setup of a call to the requested directory number. In block 100 the calling customer is connected to a directory assistance service switch, in this example switch 1. A connection is set up between the incoming link to the customer (in this case trunk 31) and voice processing unit 14 (action block 102). The voice processing unit returns tone and monitors input (action block 104). The tone is a form of prompting to customers who have already dealt with this system previously. In decision block 106 the caller response is analyzed. If the caller keys a DTMF tone signal other than zero, decision block 108 is entered. If the particular code which has been keyed is an assigned code, this code is analyzed in block 110 and is used to set the memory of control 10 to process the call according to the input tones (action block 112). The request is acknowledged in the voice message from the voice processing unit which is then released to be followed by the actions of action block 200 which include a connection to an operator. The kinds of requests represented by speech and tones are used to prepare an operator to handle an emergency call or to tell the operator that for this call the customer wants a call to be set up to a terminal associated with the directory listing which the customer was about to request.

Figure 2:
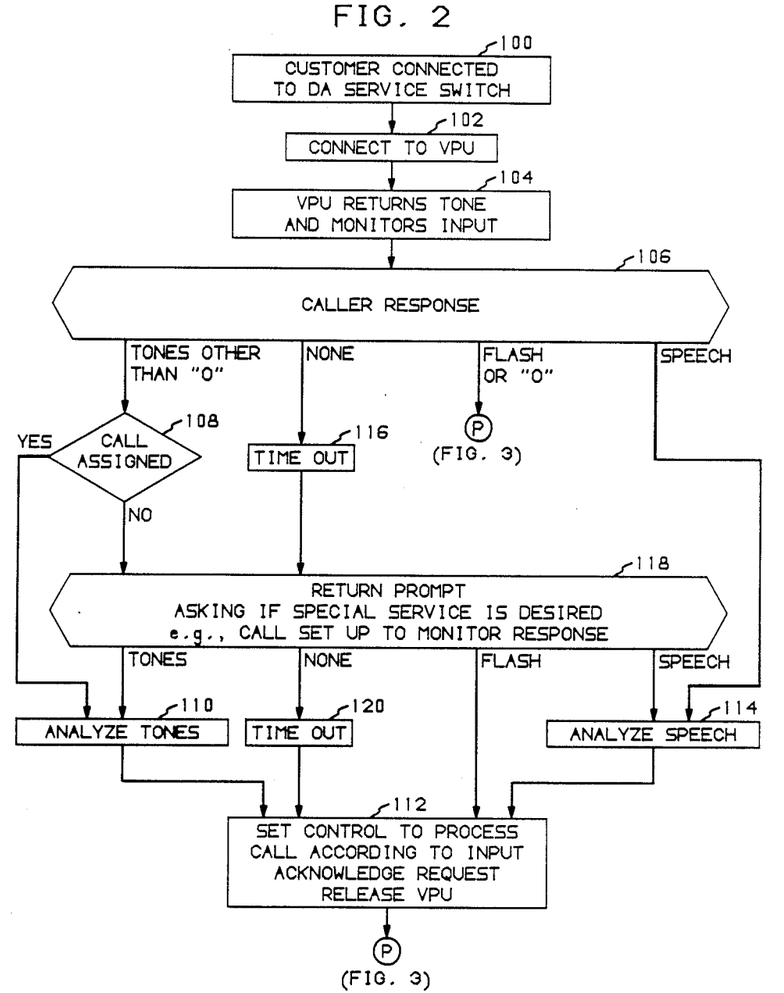
FIGS 2-5 are flow charts of programs for controlling such a switch to offer directory assistance service and for automatically setting up a connection to a customer at the requested directory number.

Returning to other possible outputs of decision block 106 which represents the analysis of the caller response after the caller has received initial tone from the voice processing unit, if the caller responds by speech this speech is analyzed in action block 114. The speech may represent a command for an emergency connection or for an automatic setup of a call. After the speech has been analyzed, action block 112, previously discussed, is executed.

If the customer flashes or keys a zero (0) then the actions described below with respect to action block 200, including a connection to an operator, are executed. If the caller does not respond with either speech or tones or a flash, this condition is detected by a timeout (action block 116) and a voice prompt is returned to the customer asking if a special service is desired (decision block 118). Decision block 118 is also entered if the calling customer has keyed an unassigned code. In decision block 118 a prompt announcement is returned asking for the type of special service desired such as call setup and the customer's response is monitored. If the customer subsequently keys tones, these tones are analyzed (action block 110, previously discussed). If the customer speaks, the speech is analyzed (action block 114, previously discussed). If the customer flashes (action block 112, previously discussed) is entered directly. If the customer does not respond by either flash or tones, then this condition is detected by a timeout (action block 120) and action block 112 is entered.

Figure 3:
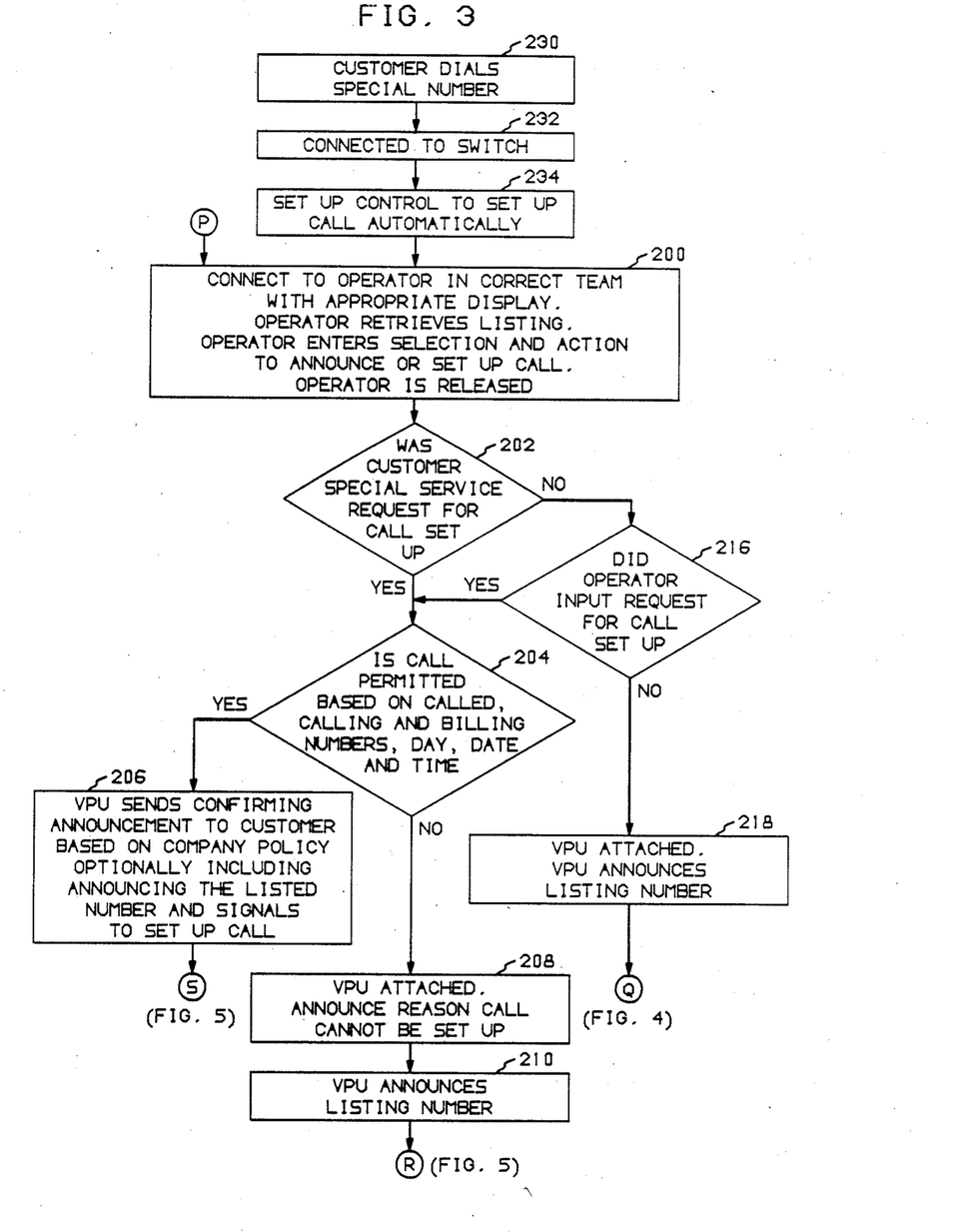

After action block 112 has been executed, action block 200 is entered. In action block 200, the customer is connected to an operator of a correct team. The different teams may be used for different types of customer requests. For example, special operators may be assigned to handle emergencies, or may specialize in setting up calls. (For example, such operators may recognize calls to a frequently requested destination such as an airport.) Alternatively, special operators may be designed to handle foreign language requests. The operator terminal 24 of the connected operator is initialized with an appropriate display which includes the calling customer's directory number (previously obtained by automatic number identification if the calling customer is served by a local switch other than switch 1 and obtained from the local data base if the customer is directly served by switch 1) and an indication of whatever special request the customer indicated as detected in the actions described with respect to FIG. 2. The operator then communicates with the customer in order to retrieve the listing associated with the customer's request and if the operator receives verbal information indicating a selection of actions, such as an automatic setup, the operator also enters such selection. The data keyed by the operator, indicated by moving a cursor on a display, or indicated by means of a light pen, is used by the directory assistance computer 56 to identify the listing. The operator is then released from the call since the actual listing, if necessary, can be announced using audio response unit 60 without requiring the time of the operator. After action block 200 has been executed, test 202 is performed to check whether the customer made a special request for call setup. If so, then test 204 is performed to check whether an automatic call setup is permitted based on the calling, called, and billing numbers and the day, date, and time. The check based on calling, called, and billing numbers is to ensure that the customer is authorized to incur charges for making the call. The day, date, and time is to check whether calls to that called number are permitted at this time. For example, a call to a large automatic call distribution system associated with a vendor may be closed on Sunday. If the call can be set up, the voice processing unit sends a confirming announcement to the customer indicating that the call will be set up and optionally including an announcement of the listed number. The option is based on the policy of the company whether on calls of this type, the number of the called customer should be announced. For example, if the call is to a major business it may be telephone company policy not to announce the listed number since the customer could have requested such a number by making a conventional directory assistance request.

If the call is not permitted, then an announcement is sent announcing the reason why the call cannot be set up (action block 208) and the voice processing unit further announces the listed number (action block 210) so that the customer can dial the call if required.

If the customer did not make a special service request, a test is made (test 216) to see if the operator made a request for automatic call setup. If the operator made this request, then decision block 204 to test whether the call is permitted is entered and the actions discussed above are performed. If the operator did not request call setup, then a voice processing unit is attached to the connection and the voice processing unit announces the directory listing (action block 218).

A special service is also provided for customers who wish to be connected to the customer identified by a directory listing. If a customer dials a special number, for example, 311 or 555-1-234, (action block 230) and is connected to the directory assistance switch (action block 232). The directory assistance switch receives signals that this is a special call and sets up the control to process the call as if the customer had already requested a call setup to the customer identified by a requested directory listing (action block 234). Thereafter, the process continues from action block 200, as previously described. Advantageously, such calls can be calls to an "800" number paid for by the called customer. The listing may or may not be announced according to the policy of the telephone administration as discussed heretofore with respect to action block 206.

Figure 4:
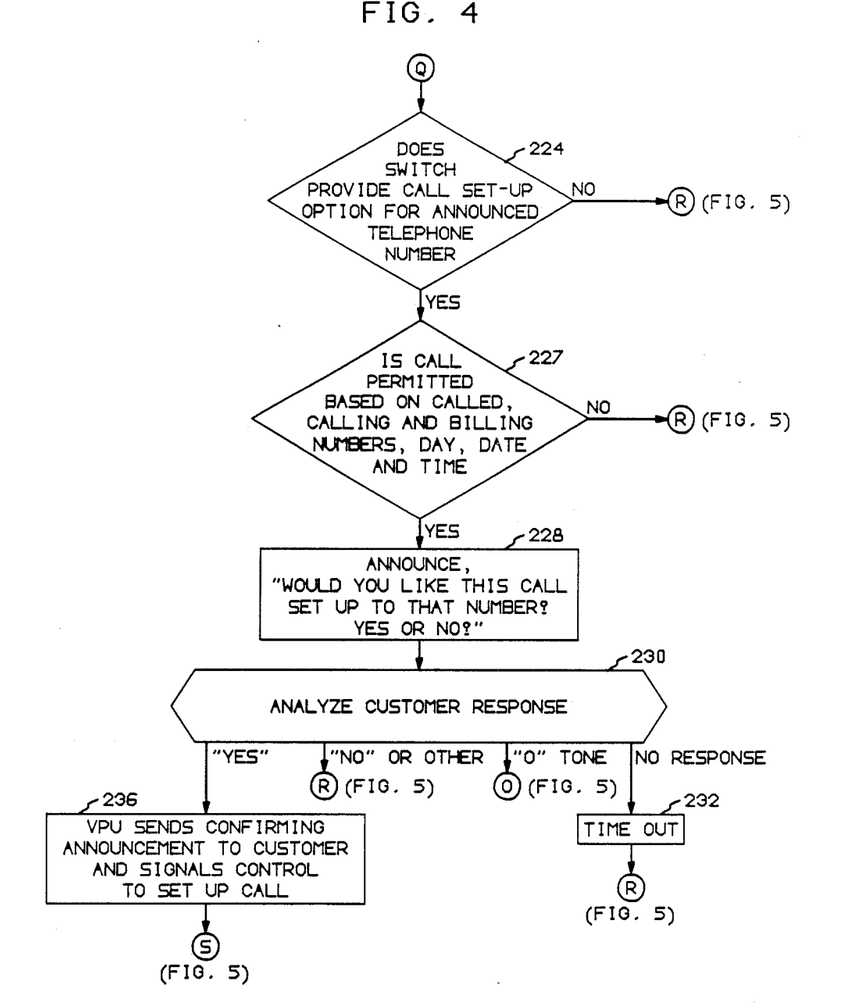

Following the announcement of the requested directory listing, a test is made again to see whether the switch provides the call set up option for the announced telephone number (FIG. 4, test 224). Test 224 is used for those cases in which the customer did not initially request the call set up but simply requested a directory listing. If the switch does provide the call setup option, then a test is made (test 227) to check whether the call is permitted based on the calling, called, and billing numbers and the day, date, and time. This test is similar to test 224 described previously. If the call is permitted, then an announcement is sent to the customer such as: "Would you like this call set up to that number, 'yes' or 'no'" (action block 228). The customer's response is analyzed (decision block 230). If the customer responds "no" or makes no response as detected by a timeout (action block 232), then the actions shown on FIG. 5 to test whether the customer wishes to be reconnected to an operator are performed. These actions are also performed if the output of test 224 indicates that the switch does not provide an option for calls set up to the announced telephone number or if the call is not permitted (as found by test 227). If the customer indicates by saying "yes" that the customer wants the call set up following the announcement of action block 228, then a voice processing unit sends a confirming announcement to the customer and signals control 10 to take the actions for setting up the call. (These actions are described in action block 260, FIG. 5.) If, following the announcement of action block 228, the customer keys a zero, then the customer will be reconnected to an operator (action block 254, FIG. 5).

Figure 5:
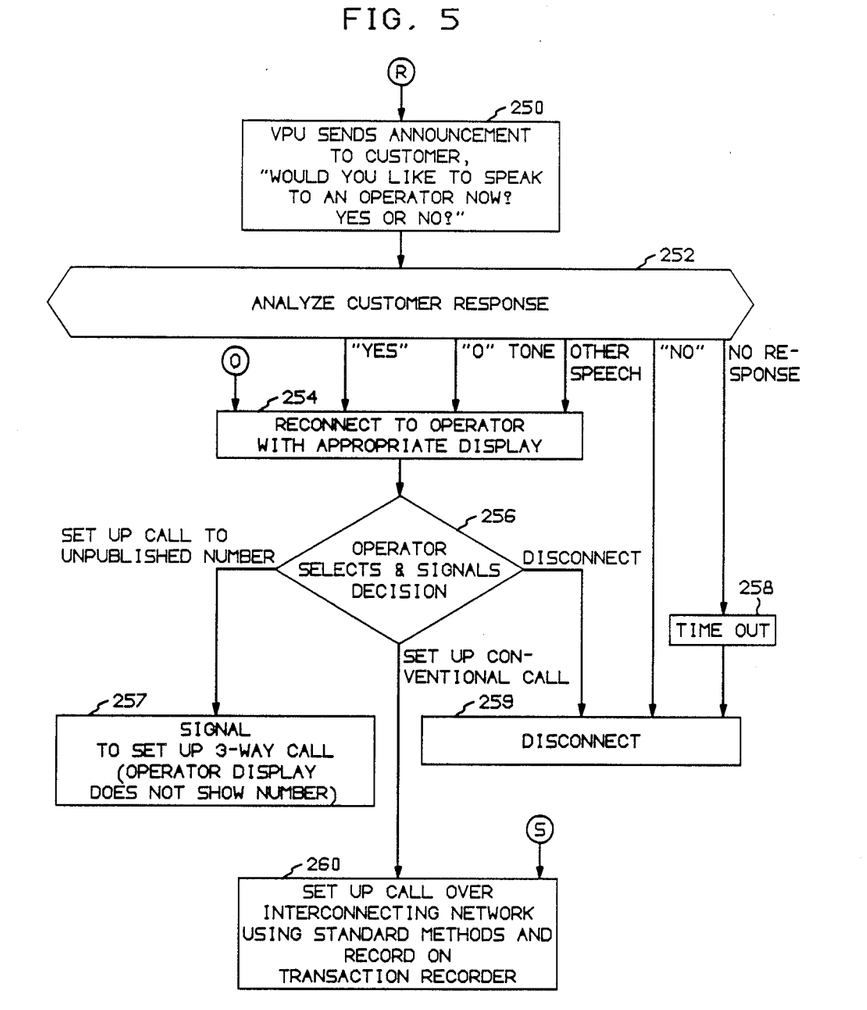

FIG. 5 is a flow diagram of actions to determine whether a customer wishes to be reconnected to an operator. The voice processing unit sends an announcement to the customer: "Would you like to speak to an operator now, 'yes' or 'no'" (action block 250). The customer's response is analyzed in decision block 252. If the customer says "no" or gives no response within a timeout interval (action block 258), the customer is disconnected (action block 259). If the customer says "yes", presses the zero button on a DTMF station, or says something else other than "no", an operator is reconnected (action block 254). The operator would have a display indicating the listing which had been announced to the customer and the information that the operator had entered into the DAS/C computer to retrieve that listing. After further verbal exchanges with the calling customer, the operator would then select and signal to control 10 (decision block 256) whether to disconnect the customer (action block 259), or to set up the call (action block 260) to the number obtained from the previous data base access.

In accordance with the present invention, if the requested directory number is unpublished, i.e., not available to the operator and not listed in a telephone directory available to customers, and the customer requests an emergency connection at the time of the reconnect, the operator may select a third alternative action (decision block 256). The operator may signal a request to set up a three-way call between the calling customer, the customer associated with the unpublished number, and the operator (action block 257). The operator remains on the connection to ensure that the emergency is being communicated. However, neither the operator nor the calling customer is informed of the unpublished number, which thereby remains private.

A voice processing unit can recognize commands represented by the tones generated by a dual tone multi-frequency (DTMF) customer station. For example, key 9 (which includes the letter Y for "yes") and key 6 (which includes the letter N for "no") can be used as alternatives to oral "yes" and "no" indications. In that case, the system responds to such tones keyed by the customer in the same way as it responds to a spoken "yes" or "no".

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a telecommunications switching network comprising a plurality of local switching systems connected to a switching system for providing directory assistance, a method of setting up a call connection, comprising the steps of dialing a number from a requesting customer station for requesting that a telephone connection be set up from said requesting customer station to a customer station identified by a directory number to be located in a subsequent locating step;

in said switching system for providing directory assistance, responsive to said dialing, automatically locating a directory number listing comprising said directory number in response to an oral customer request from a requesting customer station; and automatically causing said switching network comprising said plurality of local switching systems to set up a connection between a customer station identified by said directory number and said requesting customer station without requiring said requesting customer station to dial further signals;

wherein the step of automatically locating comprises the steps of:

receiving said oral request at an operator position;

keying data corresponding to said oral request at said operator position;

generating directory data derived from the data keyed in said keying step; and identifying said requested directory number listing from said generated directory data.

2. The method of claim 1 wherein said step of automatically causing said switching network to set up a connection comprises the step of:

sending a data message to one of said plurality of local switching systems connected to said requesting customer station, said data message comprising data requesting the establishment of a call connection between said requesting customer station and said customer station identified by said directory number.

3. The method of claim 1 wherein said step of causing said network to set up a connection comprises the step of causing said network to set up a connection from said switching system for providing directory assistance to said customer station identified by said directory number.

4. In a telecommunications switching system for providing directory assistance, of a telecommunications network comprising a plurality of local switching systems, a method of processing an incoming call received on a communication link from one of said plurality of local switching systems to said telecommunications switching system for providing directory assistance, comprising the steps of:

connecting said communication link to an operator position;

receiving an oral request for directory assistance over said link from one of said plurality of local switching systems;

keying data for identifying a directory number at said operator position and transmitting said keyed data to said data base;

identifying said directory number in said data base in response to said keyed data;

connecting means for announcing to said link;

announcing said directory number from said means for announcing over said link;

testing whether establishment of a call from a caller on said link to a station identified by said directory number is permitted;

if said testing indicates that said call to said station is permitted and in response to said announcing, monitoring, for further processing of said call, said link to detect incoming non-supervisory signals occurring within a predetermined time interval; and causing said network to set up a connection between a customer station connected to said link and a customer station identified by said directory number if said monitoring step detects a prescribed non-supervisory signal.

5. The method of claim 4 wherein said non-supervisory signals are speech signals, wherein said prescribed non-supervisory signal is a prescribed speech signal, and wherein said monitoring is performed by a speech recognition unit.

6. The method of claim 4 wherein said non-supervisory signals are one of speech signals and customer station tone signals, wherein said prescribed non-supervisory signal is one of a prescribed speech signal and a prescribed customer station tone signal, and wherein said monitoring is performed by a speech recognition unit.

7. A method of setting up a telecommunications call connection in a telecommunications switching system comprising the steps of:

receiving, over a connection to a calling customer, an oral directory assistance request by an operator at an operator's position;

entering data corresponding to the request into said operator position and transmitting the entered data to a directory number data base;

generating directory data corresponding to the entered data at the data base for announcing a directory number;

CHARACTERISED IN THAT the method further comprises the steps of:

releasing the operator position from the connection;

announcing the directory number to the calling customer over the connection;

testing whether establishment of a call from a caller on said link to a station identified by said directory number is permitted;

if said testing indicates that said call to said station is permitted, monitoring the connection for speech or non-supervisory multifrequency signals; and if a selected signal is detected, automatically setting up a connection to a customer station identified by the directory number without any further calling action from the calling subscriber.

8. The method of claim 7 wherein the step of causing the network to set up a connection comprises the step of:

sending a data message to a switch connected to said requesting customer station, said data message comprising data requesting the establishment of a call connection between said requesting customer station and said customer station identified by said directory number.

9. The method of claim 7 wherein the step of causing said network to set up a connection comprises the step of:
causing said network to set up a connection from a switch connected to an operator position for receiving said oral request to said customer station identified by said directory number.

10. The method of claim 7 further comprising the step of announcing an offer to set up a connection to the customer station identified by the directory number.

11. Apparatus for controlling a telephone connection comprising:
apparatus for receiving, over a connection to a calling customer, an oral directory assistance request at an operator's position;
the operator position comprising apparatus for entering data corresponding to the request for transmission to a data base for storing directory number information;
the data base responsive to the entered data for generating directory data comprising a requested directory number;
the apparatus CHARACTERISED IN THAT it further comprises:
means (13) for announcing the requested directory number;
means for testing whether establishment of a call from a caller on said link to a station identified by said directory number is permitted;
means for monitoring the connection for predetermined speech and non-supervisory multifrequency signals (15); and
the system (10,12) responsive to said means for testing and to the predetermined speech and non-supervisory multifrequency signals for extending the connection (33) to a called customer (46) identified by the directory number.

12. The apparatus of claim 11 further comprising means (35) for sending a data message to a switch connected to said requesting customer station, said data message comprising data requesting the establishment of a call connection between said requesting customer station and said customer station identified by said directory number.

13. The apparatus of claim 11 further comprising:
means (12,33a) for extending a connection from a switching system connected to the operator position to the customer station identified by the directory number.

14. The apparatus of claim 11 further comprising means (13) for announcing an offer to set up a connection to the customer station identified by the directory number.

15. A method of setting up a telecommunications call connection in a telecommunications switching system comprising the steps of:
responsive to receiving, over a connection to a calling customer, an oral directory assistance request by an operator at an operator's position, entering data corresponding to the request into said operator position and transmitting the entered data to a directory number data base;
generating a directory number corresponding to the entered data;
CHARACTERISED IN THAT the method further comprises the steps of:
releasing the operator position from the connection;
testing whether establishment of a call from a caller on said link to a station identified by said directory number is permitted;
if said testing indicates that said call to said station is permitted, monitoring the connection for speech or non-supervisory multifrequency signals; and
if a selected signal is detected, automatically setting up a connection to a customer station identified by the directory number without any further calling action from the calling subscriber.

* * * * *

UNITED STATES PATENT AND TRADEMARK OFFICE
CERTIFICATE OF CORRECTION

PATENT NO.   : 4,959,855

DATED        : September 25, 1990

INVENTOR(S)  : Abraham N. Daudelin

It is certified that error appears in the above-identified patent and that said Letters Patent is hereby corrected as shown below:

Claim 4, column 10, line 3, delete "said" and substitute --a--.

Signed and Sealed this

Fourth Day of February, 1992

Attest:

HARRY F. MANBECK, JR.

*Attesting Officer*                *Commissioner of Patents and Trademarks*